(12) United States Patent
Wang et al.

(10) Patent No.: US 12,442,149 B1
(45) Date of Patent: Oct. 14, 2025

(54) STRUCTURE FOR CONTROLLING CRACK GENERATIONGENERATION IN LARGE-VOLUME SLUICE GATE AND CONSTRUCTION METHOD THEREFOR (71) Applicants: Shandong Jiaotong University, Jinan (CN); Qingzhou waterengineering construction limited company, Weifang (CN); SHANDONG PROVINCE WATER CONSERVANCY BUREAU CO., LTD, Jinan (CN)

(72) Inventors: Keliang Wang, Jinan (CN); Chuanli Zhong, Jinan (CN); Tao Li, Jinan (CN); Guangtai Gao, Jinan (CN); Ce Li, Jinan (CN); Maozhi Tian, Jinan (CN); Xinwei Hao, Jinan (CN); Kuo Ma, Jinan (CN); Xiang'an Niu, Jinan (CN); Fan Feng, Jinan (CN); Qinchao Zhang, Jinan (CN); Peng Wang, Jinan (CN); Shuyuan Li, Jinan (CN); Jie Yu, Jinan (CN); Gangnian Xu, Jinan (CN); Shengwei Fan, Jinan (CN); Zhide Huang, Jinan (CN); Peigang Jiao, Jinan (CN)

(73) Assignees: Shandong Jiaotong University, Jinan (CN); Qingzhou waterengineering construction limited company, Weifang (CN); SHANDONG PROVINCE WATER CONSERVANCY BUREAU CO., LTD, Jinan (CN)

(*) Notice: Subject to any disclaimer, the term of this patent is extended or adjusted under 35 U.S.C. 154(b) by 0 days.

(21) Appl. No.: 19/250,104

(22) Filed: Jun. 26, 2025

(30) Foreign Application Priority Data

Feb. 19, 2025 (CN) .......................... 202510179851.5

(51) Int. Cl.
E02B 8/04 (2006.01)
E02B 7/54 (2006.01)

(52) U.S. Cl.
CPC . E02B 8/04 (2013.01); E02B 7/54 (2013.01)

(58) Field of Classification Search
CPC .................................... E02B 8/04; E02B 7/54
See application file for complete search history.

(56) References Cited

U.S. PATENT DOCUMENTS

| 4,834,579 A * | 5/1989 | Aris ........................ E02B 3/102 |
| | | 405/116 |
| 2011/0245372 A1* | 10/2011 | Huang .................... C04B 28/02 |
| | | 525/333.1 |

FOREIGN PATENT DOCUMENTS

| CN | 103882836 A | 6/2014 |
| CN | 106223184 A | 12/2016 |
| CN | 220202360 U | * 12/2023 |

* cited by examiner

Primary Examiner — Janine M Kreck (57) ABSTRACT

Provided are a structure for controlling crack generation in a large-volume sluice gate and a construction method therefor. The structure includes: a sluice floor and a pier, the sluice floor and the pier are formed by a process of pouring concrete, and the pier is disposed above the sluice floor; at least one cavity, defined in the pier, the at least one cavity is reserved in the process of pouring the concrete, and the at least one cavity serves as a self-restraint stress hole; and a tough material, the tough material is configured for stress absorption, the tough material is filled in the at least one cavity, and the tough material is integrated with an inner wall of the at least one cavity. The construction method includes: performing construction preparation; performing foundation treatment; performing construction of the sluice floor; and performing construction of the pier.

9 Claims, 8 Drawing Sheets

STRUCTURE FOR CONTROLLING CRACK GENERATIONGENERATION IN LARGE-VOLUME SLUICE GATE AND CONSTRUCTION METHOD THEREFOR

CROSS-REFERENCE TO RELATED APPLICATION

This application claims priority to Chinese patent application No. CN 202510179851.5, filed to China National Intellectual Property Administration (CNIPA) on Feb. 19, 2025, which is herein incorporated by reference in its entirety.

TECHNICAL FIELD

The present disclosure relates to the technical field of sluice gates, and particularly to a structure for controlling crack generation in a large-volume sluice gate and a construction method therefor.

BACKGROUND

A sluice gate consists of a sluice floor and piers, and is a large-volume concrete structure. Due to a massive size and a complex structure of the large-volume concrete structure, together with a poor thermal conductivity of concrete, heat generated by cement hydration tends to accumulate inside the large-volume concrete structure and is difficult to dissipate. If a control issue for the heat is not properly addressed, it can easily lead to a crack in the large-volume concrete structure. Therefore, a primary cause of cracks in the piers is that a tensile stress induced by temperature changes after concrete solidification exceeds an ultimate tensile strength of the large-volume concrete structure.

In current related arts, research on crack control in sluice gates mostly focuses on connection positions between the piers and the sluice floor. For example, a previously filed Chinese invention patent filed by the applicant, titled "METHOD FOR CONTROLLING crack generation IN PIERS OF SLUICE GATE AND FILLING DEVICE" with an authorization announcement No. CN103882836B, proposed installation of a stress-absorbing layer between the piers and the sluice floor to control cracks in the piers. However, while this method effectively mitigates the cracks at the connection positions between the piers and the sluice floor, some cracking issues persist in the piers other than connection positions between the piers and the sluice floor. This is because, during a pouring process, cement releases a significant amount of hydration heat as the concrete hardens, thereby causing an internal temperature to rise continuously. This results in a tensile stress on a surface of the concrete, and the tensile stress cannot freely expand, thereby leading to a tensile stress in the concrete. Further, since the concrete is a brittle material with a lower tensile strength, when the tensile stress in the concrete exceeds a tensile strength of the concrete, cracks are thus formed.

To address this issue, some solutions have been proposed in the related arts, such as using low-heat or moderate-heat cement during a construction process of the piers and arranging cooling water pipes for water cooling in a pouring process. For instance, an invention patent with a publication No. CN107905232A introduced a construction method and device for cooling large-volume concrete in piers of a tidal sluice using water circulation. While the process of introducing cooling water can really play a positive role in controlling crack generation in the pier concrete, an internal temperature of the concrete is higher and a temperature of the cooling water pipe is lower, and a temperature difference between them is very large, resulting in a large temperature gradient. The temperature of the concrete near the cooling water pipe is greatly influenced by the change of cooling water temperature. The larger temperature difference between the internal concrete and a wall of the cooling water pipe leads to the early cracking of the concrete at the pipe wall, which will produce several tiny cracks, and positions where the tiny cracks are located will become weak points. The piers will not have problems during an early operation, but in the later service, under the influence of multiple factors, such as an internal stress of concrete of the piers and an environmental temperature change (especially caused by cold wave attack) during operation, the concrete is deformed, and these tiny cracks will induce large cracks, which will destroy the integrity, stability, durability and waterproof of the concrete structure and affect the normal use of the concrete structure.

In summary, whether using low/moderate-heat cement or cooling water pipes for water cooling, current approaches primarily focus on material composition and construction processes for crack control, while how to control the cracks of the piers after construction has not been effectively concerned and prevented in advance. Measured data of engineering shows that it is very difficult to prevent cracks by simply using reinforcement bars. Before the concrete cracks, stress of the reinforcement bars is very small, and only after cracks, the stress of the reinforcement bars increases significantly. The reinforcement bars can only play a role in limiting widths of the cracks and can only provide passive defense.

Based on this, based on the prior arts, how to further effectively control the cracks in the piers, so as to achieve advance prevention rather than passive defense, and improve the durability and safety of the sluice gate, needs further study.

SUMMARY

The present disclosure aims to solve at least one of the technical problems in the related arts to a certain extent. As such, the present disclosure proposes a structure for controlling crack generation in a large-volume sluice gate and a construction method therefor.

The technical solutions of the present disclosure for solving the technical problems are as follows.

In a first aspect, an embodiment of the present disclosure provides a structure for controlling crack generation in a large-volume sluice gate. The structure includes: a sluice floor and a pier, where the sluice floor and the pier are formed by a process of pouring concrete, and the pier is disposed above the sluice floor; at least one cavity, defined in the pier, where the at least one cavity is reserved in the process of pouring the concrete, and the at least one cavity is used as a self-restraint stress hole; and a tough material, where the tough material is configured for stress absorption, the tough material is filled in the at least one cavity, and the tough material is integrated with an inner wall of the at least one cavity.

In an embodiment, the tough material is at least one selected from the group consisting of rubberized concrete, acrylic latex-modified concrete, acrylic latex-rubber hybrid concrete, rubberized mortar, and acrylic latex-rubber composite mortar.

In an embodiment, the tough material includes at least two tough materials with different strains, and the at least two tough materials are formed as a coaxial nested structure.

In an embodiment, each of the at least one cavity is a fully enclosed structure, and both ends of each of the at least one cavity are closed and entirely embedded within the pier.

In an embodiment, each of the at least one cavity is a semi-enclosed structure, a bottom end of each of the at least one cavity is embedded within the pier and is a closed end, and a top end of each of the at least one cavity extends to a top of the pier and connects with an external environment to form an open end.

In an embodiment, each of the at least one cavity is an open-type structure, each of the at least one cavity penetrates through the pier from a bottom of the pier to a top of the pier, and both ends of each of the at least one cavity are respectively flush with a bottom surface and a top surface of the pier.

In an embodiment, a bottom end of each of the at least one cavity extends through the pier into the sluice floor.

In an embodiment, a stress absorption layer is provided at a joint between the sluice floor and the pier, and a bottom end of each of the at least one cavity penetrates through the stress absorption layer.

In a second aspect, an embodiment of the present disclosure provides a construction method for a structure for controlling crack generation in a large-volume sluice gate, and the construction method includes the following steps:

S1, performing construction preparation;
S2, performing foundation treatment;
S3, performing construction of a sluice floor, including:
  binding and installing sluice floor reinforcement bars, erecting a sluice floor formwork, concrete pouring, and forming the sluice floor; and
S4, performing construction of a pier, including the following steps:
  S41, performing construction layout;
  S42, binding and installing pier reinforcement bars;
  S43, erecting a pier formwork above the sluice floor;
  S44, pre-embedding and installing a cavity-forming device at a designed position;
  S45, pouring concrete, vibrating the concrete, and curing the concrete; and
  S46, after the concrete begins to set, extracting the cavity-forming device to form at least one cavity in the pier, and filling a tough material in the at least one cavity for stress absorption.

In an embodiment, in step S46, the cavity-forming device is pre-filled with the tough material, and the tough material is filled into the at least one cavity synchronously during the extracting of the cavity-forming device. The cavity-forming device includes an outer tube body, a bottom end of the outer tube body is connected to a bottom sealing plate, the bottom sealing plate defines at least one discharge port, an inner tube body is disposed in the outer tube body, and a bottom of the inner tube body is fixedly connected to a center of the bottom sealing plate; a space is defined between the inner tube body and the outer tube body and is used as a storage space for storing the tough material; an airbag capable of inflating and deflating (i.e., an inflatable/deflatable airbag) is sleeved on the inner tube body, and the airbag is annular; an inner circumferential wall of the airbag is connected to the inner tube body; an air tube is disposed in the inner tube body, a bottom end of the air tube is connected with the airbag, and a top end of the air tube extends above a top of the outer tube body; an air tube is provided with a switch thereon; and when the airbag is inflated, the airbag completely blocks the discharge port, when the airbag is deflated, the discharge port is opened to realize leakage of the tough material.

Compared with the related arts, the above technical solutions have the following advantages or beneficial effects.

1. Structurally, in the present disclosure, the self-restraint stress hole is formed by reserving the cavity in the pier, the cavity is filled with the tough material, the strength of the tough material is basically the same as that of the concrete surrounding the tough material, and the tough material can effectively absorb a stress generated in the pier, thereby ensuring that a maximum stress in the pier is less than an ultimate tensile strength of the concrete in the pier, thus effectively controlling crack generation in the pier, ensuring the construction quality, and improving the durability and safety of the project.
2. The cavity is filled with at least two kinds of tough materials with different strains, thus forming a certain strain gradient, which is beneficial to avoid stress concentration at an interface between the tough materials and the surrounding concrete, and at the same time improves the integrity of the structure.
3. Technologically, a construction method of reserving the cavity is adopted in the present disclosure, which has simple technology, compared with a drilling-filling technology, the construction method of the present disclosure saves steps, saves time and labor, and can effectively improve the construction efficiency. Whether the cavity is closed, semi-open, or fully open, the cavity can be constructed by a reserved process, which has a wider application range and small limitations and can meet different sluice construction requirements.
4. Technologically, in the present disclosure, the cavity-forming device is used for the reserved construction of the cavity. The cavity-forming device is simple in structure, utilizes readily available materials, and is easily fabricated, which provides convenient conditions for the rapid construction of the cavity and the convenient filling of the tough material.
5. In terms of structure and process coordination, as there is the tough material stored in the cavity-forming device, the tough material can play a certain supporting role during pouring, improve an overall strength of the cavity-forming device, and prevent the cavity-forming device from being crushed and damaged during pouring. A timing, i.e., after the initial setting of concrete, is selected to pulling out the cavity-forming device, and a process of filling the tough material while pulling out the cavity-forming device is adopted to ensure that the filled tough material is effectively connected with the surrounding concrete, forming a fully integrated structure, ensuring the overall strength and absorbing stress, and effectively controlling the crack generation of the pier.
6. Compared with the process of controlling sluice crack generation by introducing cold water, the present disclosure is simple in construction and can ensure the structural integrity. Compared with the method of adopting low-heat or medium-heat cement, the present disclosure has the advantages of lower construction cost and cost saving. This structural design of the present disclosure can not only absorb the internal restraint stress of the pier, but also reduce the restraint stress of the sluice floor on the pier.

BRIEF DESCRIPTION OF DRAWINGS

Accompanying drawings are provided to provide a further understanding of the present disclosure and constitute a part

REFERENCE NUMERALS

1. Outer tube body; 2. Inner tube body; 3. Connecting rod; 4. Air tube; 5. Switch; 6. Bottom sealing plate; 7. Discharge port; 8. Airbag; 9. Storage space; 10. Sluice floor; 11. Pier; 12. Cavity; 13. Tough material; 131. First tough material; 132. Second tough material; 14. Sluice floor reinforcement bar; 15. pier reinforcement bar; 16. Stress absorption layer; b. Cavity-forming device.

DETAILED DESCRIPTION OF EMBODIMENTS

Embodiments of the present disclosure will be described in detail hereinafter, and examples of the embodiments are illustrated in the accompanying drawings. Throughout the drawings, the same or similar reference numerals denote the same or similar elements or elements having the same or similar functions. The embodiments described below by referring to the accompanying drawings are exemplary and are intended to explain the present disclosure, but not to be construed as limiting the present disclosure.

In the description of the present disclosure, terms "first", "second" and the like are only used for descriptive purposes and cannot be understood as indicating or implying relative importance. In addition, in the description of the present disclosure, unless otherwise specified, the term "multiple" means two or more.

In the description of this specification, descriptions referring to terms "one embodiment", "some embodiments", "examples", "specific examples" or "some examples" mean that specific features, structures, materials or characteristics described in connection with this embodiment or example are included in at least one embodiment or example of the present disclosure. In this specification, the schematic expressions of the above terms do not necessarily refer to the same embodiment or example. Moreover, the specific features, structures, materials or characteristics described may be combined in any one or more embodiments or examples in a suitable manner.

Embodiment 1

As shown in FIG. 1 through FIG. 8, the embodiment 1 proposes a structure for controlling crack generation in a large-volume sluice gate. The structure includes a sluice floor 10 and a pier 11, which are formed by a process of pouring concrete. The pier 11 is disposed above the sluice floor 10 and is connected to the sluice floor 10.

Figure 1:
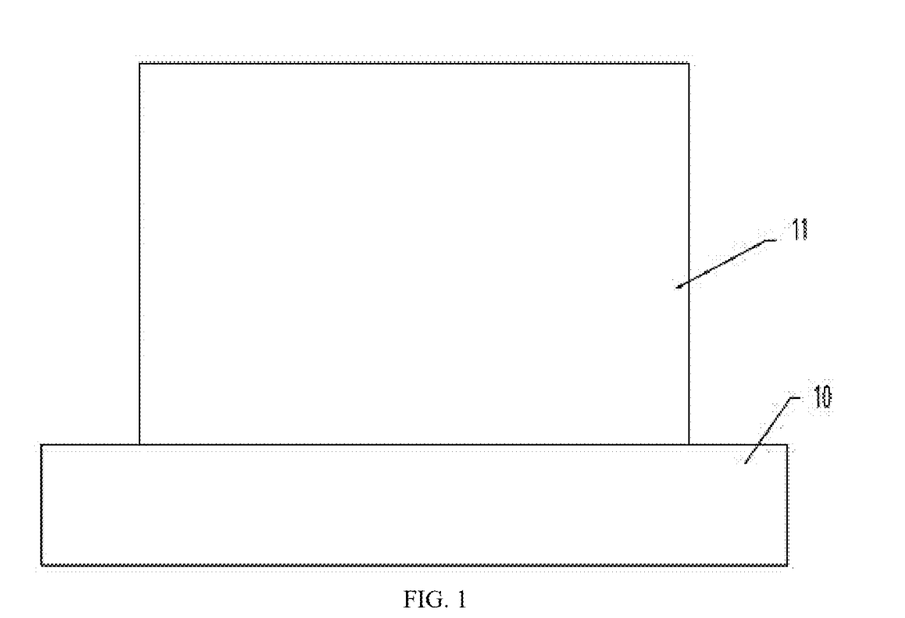
FIG. 1 illustrates a front view of a structure for controlling crack generation in a large-volume sluice gate according to an embodiment of the present disclosure.

In addition, at least one cavity 12 is defined in the pier 11, and the cavity 12 is reserved in the process of pouring the concrete. The cavity 12 is used as a self-restraint stress hole. The structure further includes a tough material 13 for stress absorption, which is filled in the cavity 12. The tough material 13 is integrated with an inner wall of the cavity 12, and a strength of the tough material 13 is basically the same as that of the concrete surrounding the tough material 13. The tough material 13 can effectively absorb a thermal deformation energy generated by concrete hydration of the pier 11, release a thermal stress, reduce a stress constraint and effectively control the crack regression of the pier 11.

In this embodiment, the tough material 13 has good mechanical and deformation properties. In this embodiment, the tough material 13 includes but is not limited to rubberized concrete, acrylic latex-modified concrete, acrylic latex-rubber hybrid concrete, rubberized mortar, or acrylic latex-rubber composite mortar.

Regarding a structural form of the cavity 12, it can be one of the following four types.

Figure 2:
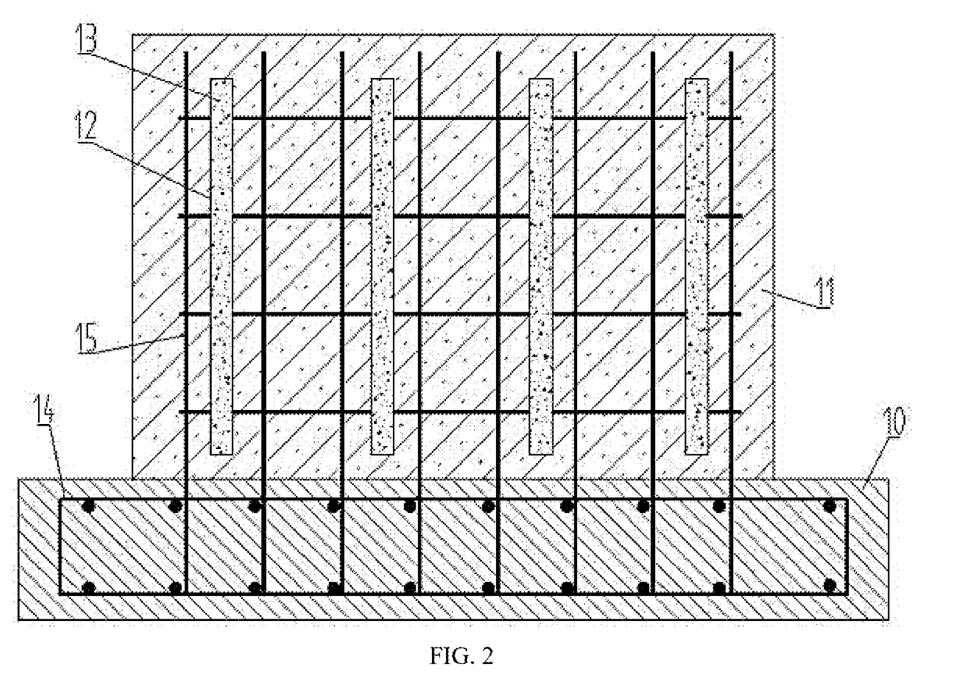
FIG. 2 illustrates a structural sectional view of a first example of FIG. 1.

A first type of cavity 12 is a fully enclosed structure, with both ends of the cavity 12 being closed and entirely embedded within the pier 11, as shown in FIG. 2.

Figure 3:
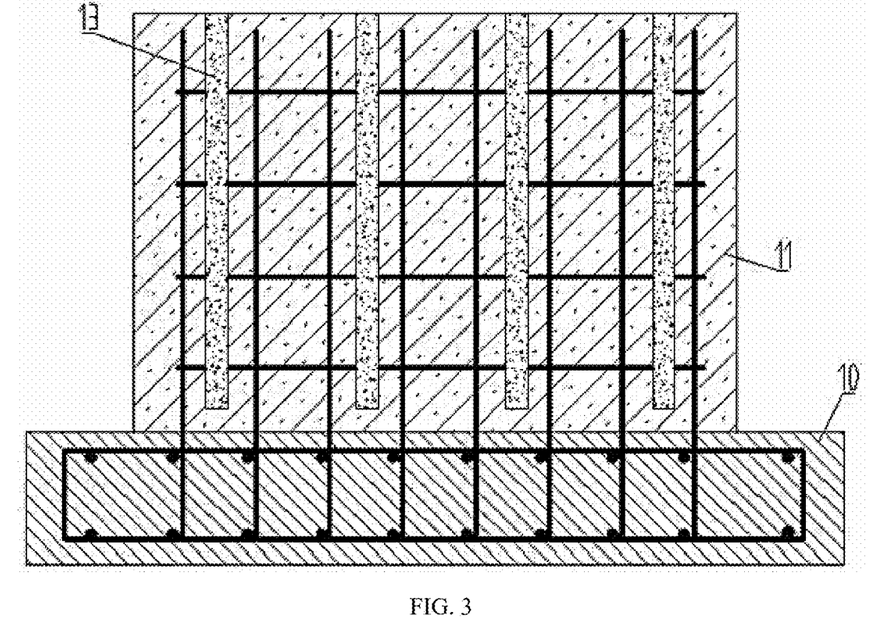
FIG. 3 illustrates a structural sectional view of a second example of FIG. 1.

A second type of cavity 12 is a semi-enclosed structure. A bottom end of the cavity 12 is embedded within the pier 11 and is a closed end. A top end of the cavity 12 extends to a top of the pier 11 and connects with an external environment to form an open end, as shown in FIG. 3.

Figure 4:
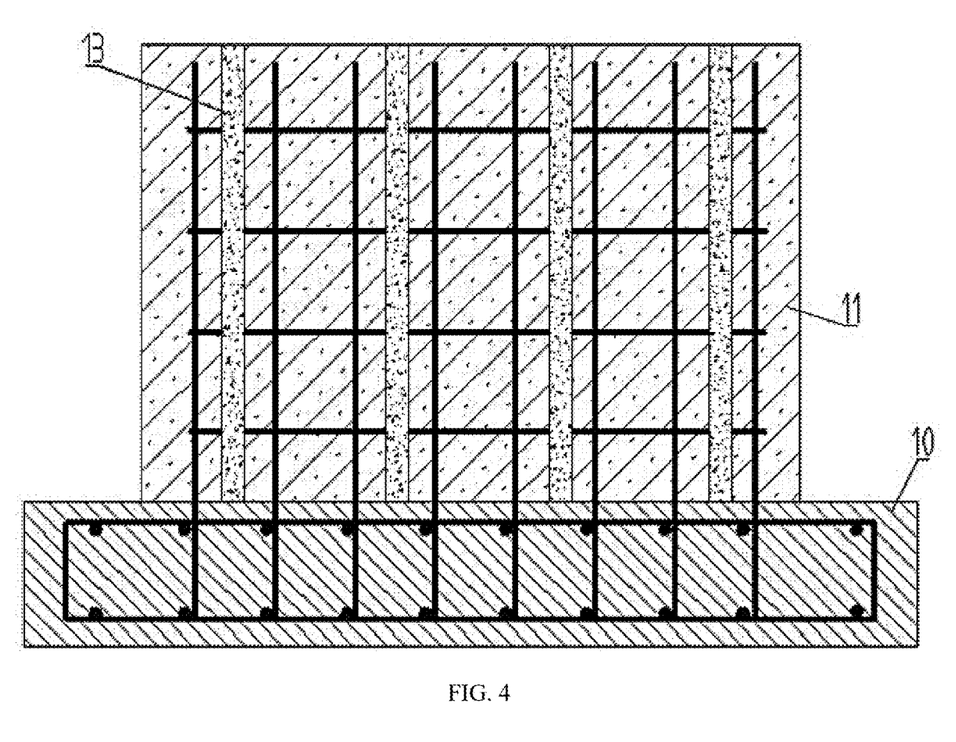
FIG. 4 illustrates a structural sectional view of a third example of FIG. 1.

A third type of cavity 12 is an open-type structure, and the cavity 12 penetrates through the pier 11 from a bottom of the pier 11 to a top of the pier 11. Both ends of the cavity 12 are respectively flush with bottom and top surfaces of the pier 11, as shown in FIG. 4.

Figure 5:
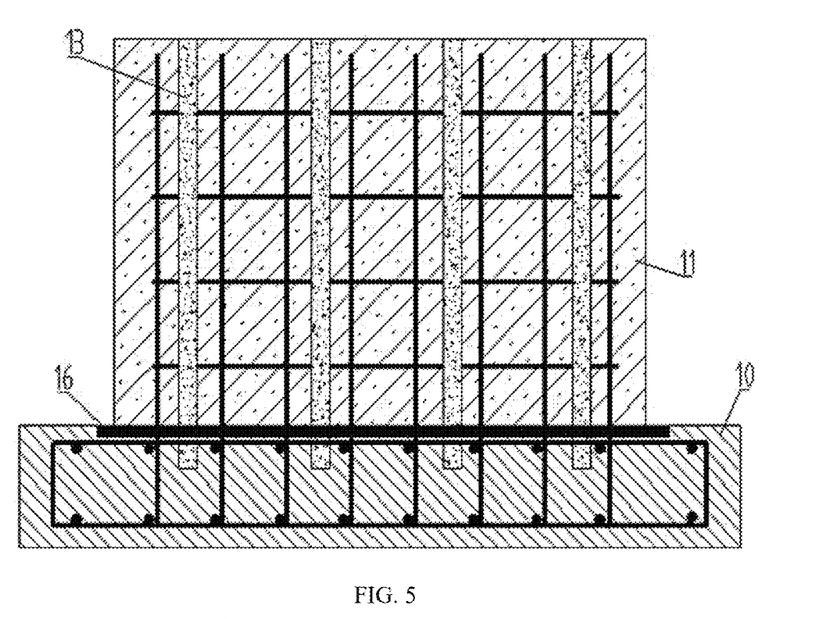
FIG. 5 illustrates a structural sectional view of a fourth example of FIG. 1.

Based on any of the above three structural forms, a bottom end of a fourth type of cavity 12 extends through the pier 11 into the sluice floor 10, as shown in FIG. 5. In this embodiment, a stress absorption layer 16 is provided at a joint between the sluice floor 10 and the pier 11. The bottom end of the cavity 12 penetrates through the stress absorption layer 16. Alternatively, as another feasible embodiment, the stress absorption layer 16 may not be provided between the pier 11 and the sluice floor 10. When the stress absorption layer 16 is adopted, the stress absorption layer 16 may be one of acrylic latex-modified mortar (ALM), crumb rubber aggregate mortar (CRAM), or hybrid acrylic latex-crumb rubber mortar (HALCRM), which can refer to the applicant's previous authorized patent, titled "METHOD FOR CONTROLLING crack generation IN PIERS OF SLUICE GATE AND FILLING DEVICE" with the authorization announcement No. CN103882836B.

Figure 6:
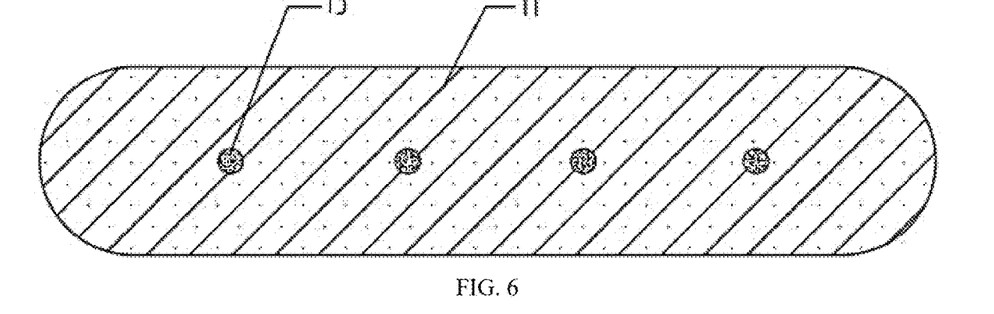
FIG. 6 illustrates a structural sectional view of an example a of a pier in FIG. 1 from a top-view perspective.
Figure 7:
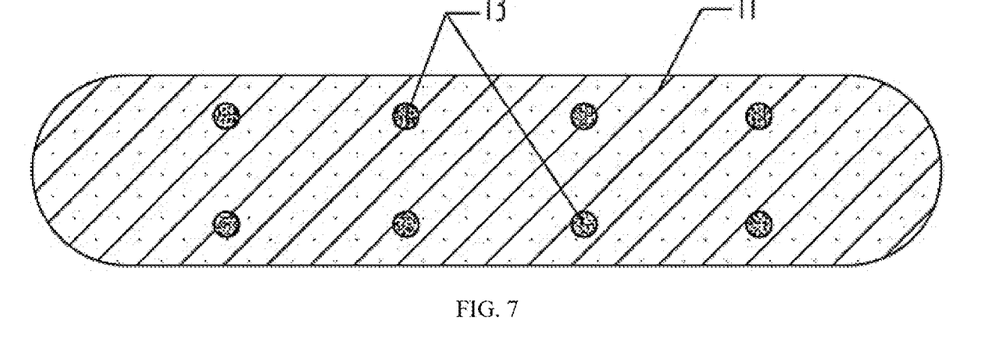
FIG. 7 illustrates a structural sectional view of an example b of the pier in FIG. 1 from the top-view perspective.
Figure 8:
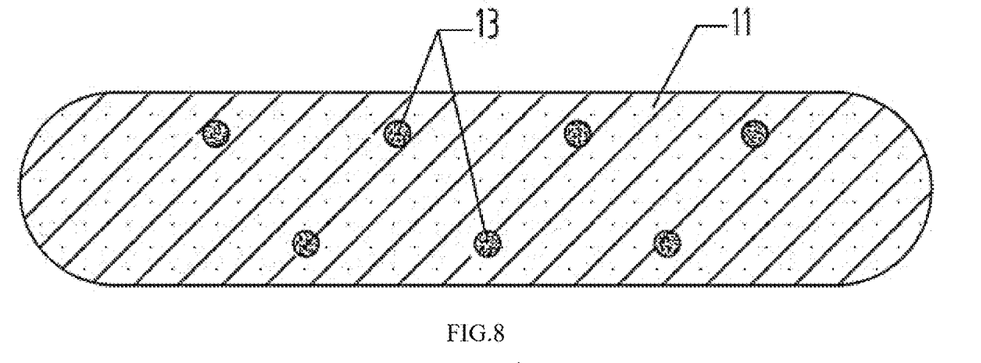
FIG. 8 illustrates a structural sectional view of an example c of the pier in FIG. 1 from the top-view perspective.

In this embodiment, one or at least two cavities 12 can be arranged. Alternatively, a single row of cavities 12 or multiple rows of cavities 12 can be arranged, as shown in FIG. 6 to FIG. 8. When multiple rows of cavities 12 are arranged, for example, two rows of cavities 12, adjacent two rows of cavities 12 are arranged in a staggered manner.

The structure has the following application effects.

Firstly, structurally, in this technical solution, the self-restraint stress hole is formed by reserving the cavity 12 in the pier 11, the cavity 12 is filled with the tough material 13, the strength of the tough material 13 is basically the same as that of the concrete surrounding the tough material 13, and the tough material 13 can effectively absorb a stress generated in the pier 11, thereby ensuring that a maximum stress in the pier 11 is less than an ultimate tensile strength of the concrete in the pier 11, thus effectively controlling crack generation in the pier 11, ensuring the construction quality, and improving the durability and safety of the project.

In addition, the tough material 13 cooperates with reinforcement bars in the pier 11 to form a dual-control system of "prevention in advance and passive defense", which can better control the development of smaller cracks in the pier 11 to larger cracks, which is beneficial to a long-term operation of the pier 11 and improves the durability and safety of the pier 11.

Secondly, in terms of technology, a construction method of reserving the cavity 12 is adopted in the present disclosure, which has simple technology, compared with a drilling-filling technology, the construction method of the present disclosure saves steps, saves time and labor, and can effectively improve the construction efficiency. Whether the cavity 12 is closed, semi-open, or fully open, the cavity 12 can be constructed by a reserved process, which has a wider application range and small limitations and can meet different sluice construction requirements.

In summary, compared with the process of controlling sluice crack generation by introducing cold water, the present disclosure is simple in construction and can ensure the structural integrity. In the process of introducing cooling water, the cooling water pipe is embedded in the concrete of the pier, and an inside of the cooling water pipe is hollow, which makes the internal structure of the pier incomplete. In contrast, this solution of the present disclosure fills the cavity with the tough material, leaving no void inside the pier, thereby maintaining structural integrity and overall strength. Compared with the method of adopting low-heat or medium-heat cement, the present disclosure has the advantages of lower construction cost and cost saving. This structural design of the present disclosure can not only absorb the internal restraint stress of the pier 11, but also reduce the restraint stress of the sluice floor 10 on the pier 11.

Embodiment 2

With reference to FIGS. 9-13, the embodiment 2 proposes a construction method for a structure for controlling crack generation in a large-volume sluice gate, and the construction method includes the following steps S1, S2, S3, and S4.

In step S1, construction preparation is performed, which includes: developing a construction plan, determining construction materials and devices, conducting personnel training, and the like.

In step S2, foundation treatment is preformed, which includes: before constructing a sluice floor 10 and a pier 11, treating a foundation to ensure a bearing capacity and stability of the foundation.

In step S3, construction of the sluice floor 10 is performed, which includes: binding and installing sluice floor reinforcement bars 14, erecting a sluice floor formwork, concrete pouring, and forming the sluice floor 10. Specifically, step S3 includes steps S31, S32, S33, and S34.

In step S31, the binding and installing sluice floor reinforcements 14 includes: binding the sluice floor reinforcements 14 according to requirements of design drawings to ensure that spacings and anchorage lengths of the sluice floor reinforcements 14 meet specifications.

In step S32, the erecting a sluice floor formwork includes: selecting a suitable sluice floor formwork, and installing a plate support system according to the requirements of design drawings to ensure stability of the sluice floor formwork.

In step S33, the concrete pouring includes: adopting a layered pouring method to pour concrete, and compacting the concrete by vibration.

In step S34, the forming the sluice floor 10 includes: after pouring, promptly cure the concrete to ensure a strength of the concrete, and removing the sluice floor formwork to obtain the formed sluice floor 10.

In step S4, construction of the pier 11 is performed, which mainly includes the following steps S41, S42, S43, S44, S45, and S46.

In step S41, construction layout is performed.

In step S42, binding and installing pier reinforcement bars 15 are performed.

In step S43, erecting a formwork of the pier 11 above the sluice floor 10 is performed.

Figure 13:
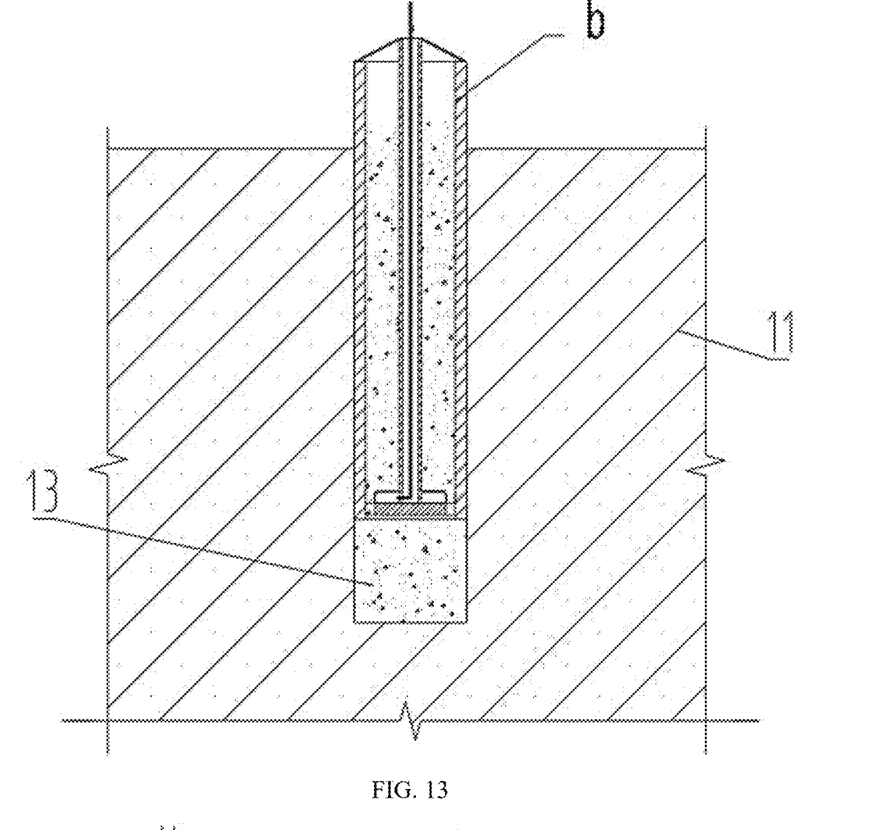
FIG. 13 illustrates a construction state diagram of the cavity-forming device during extraction while simultaneously filling a tough material.

In step S44, the following process is performed: pre-embedding and installing a cavity-forming device b at a designed position, and temporarily fixing the cavity-forming device b to the pier reinforcement bars 15.

In step S45, a process of pouring concrete, vibrating the concrete and curing the concrete is performed.

In step S46, after the concrete begins to set, the cavity-forming device b is extracted to form at least one cavity 12. The at least one cavity 12 is filled with a tough material 13 for stress absorption. The extraction is performed mechanically, with attention to controlling an extraction speed.

In some embodiments, in step S46, the cavity-forming device b is pre-filled with the tough material 13, The tough material 13 is filled into the cavity 12 synchronously during the extracting of the cavity-forming device b.

Figure 9:
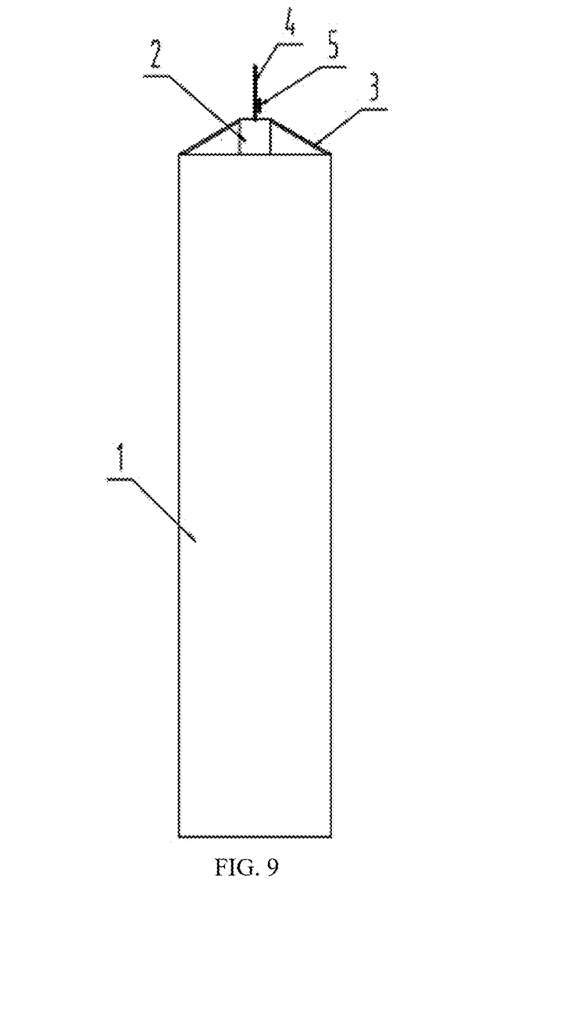
FIG. 9 illustrates a front view of a cavity-forming device of the present disclosure.
Figure 10:
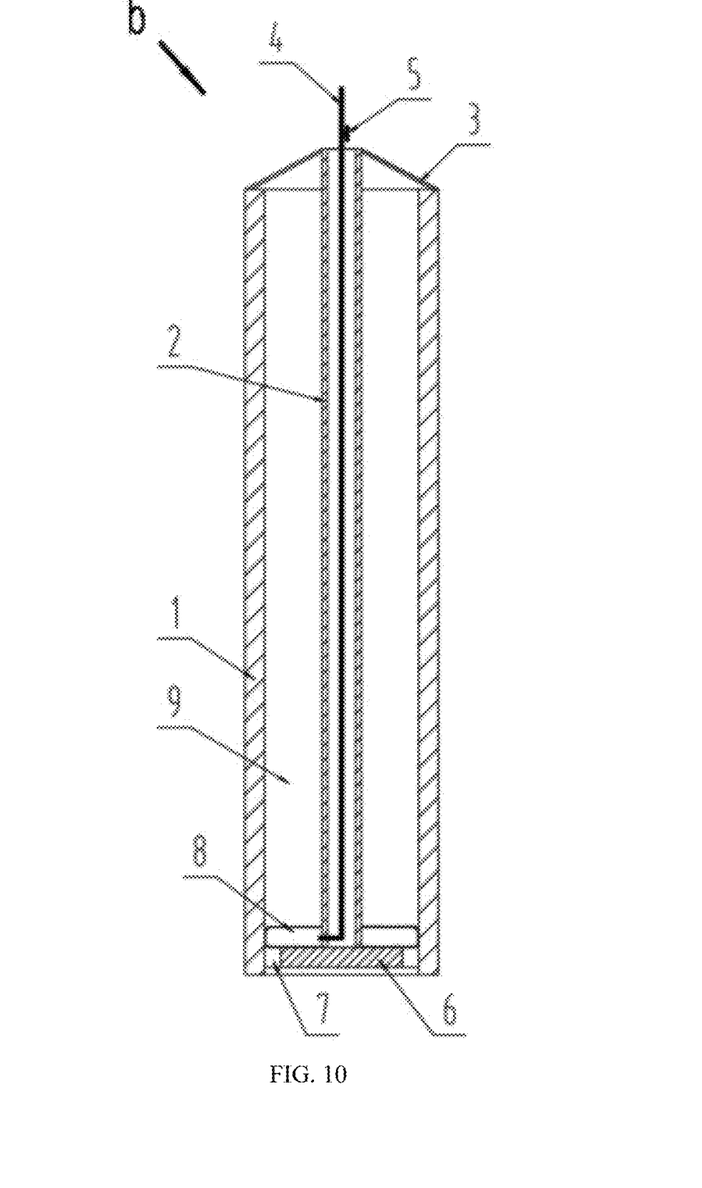
FIG. 10 illustrates a sectional view of the cavity-forming device in FIG. 9.
Figure 11:
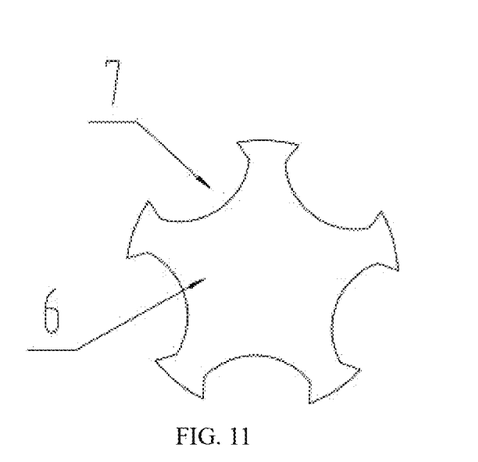
FIG. 11 illustrates a bottom view of a bottom sealing plate in FIG. 10.

In some embodiments, a structure of the cavity-forming device b can be designed as follows.

The cavity-forming device b includes an outer tube body 1, and a bottom end of the outer tube body 1 is connected to a bottom sealing plate 6. The bottom sealing plate 6 defines at least one discharge port 7. An inner tube body 2 is disposed in the outer tube body 1, and a bottom of the inner tube body 2 is fixedly connected to a center of the bottom sealing plate 6. A space is defined between the inner tube body 2 and the outer tube body 1 and is used as a storage space 9 for storing the tough material 13. An airbag 8 capable of inflating and deflating is sleeved on the inner tube body 2, and the airbag 8 is annular. An inner circumferential wall of the airbag 8 is connected to the inner tube body 2. An air tube 4 is disposed in the inner tube body 2, a bottom end of the air tube 4 is connected with the airbag 8, and a top end of the air tube 4 extends above a top of the outer tube body 1. The air tube 4 is provided with a switch thereon for controlling inflation and deflation of the airbag 8. When the airbag 8 is inflated, the airbag 8 expands and completely blocks the discharge port 7, so that normal blanking cannot be performed at this time, i.e., preventing material discharge. When the airbag 8 is deflated, the airbag 8 contracts, and at this time, the discharge port 7 is opened to realize leakage of the tough material 13, and the tough material 13 falls into the cavity 12 through the discharge port 7.

In this embodiment, the airbag 8 can be made of rubber dam bag material, which is wear-resistant and not easy to be damaged.

Figure 12:
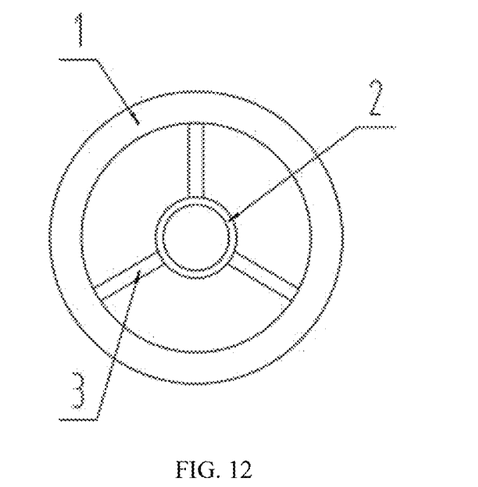
FIG. 12 illustrates a top view of an outer tube body and an inner tube body in FIG. 9.

In this embodiment, connecting rods 3 are connected to tops of the inner tube body 2 and the outer tube body 1, and the connecting rods 3 bind the inner tube body 2 and the outer tube body 1 into an integrated structure. The connecting rods 3 can be used as lifting points during extracting the cavity-forming device b. A number of the connecting rods 3 can be 2-5, which are evenly distributed along a circumferential direction of the inner tube body 2 and the outer tube body 1.

Specifically, a usage method of the cavity-forming device b is as follows.

The airbag 8 is inflated by using an inflating device until the airbag 8 completely closes the discharge port 7. Then, the tough material 13, such as polymer-modified mortar, is added into the cavity-forming device b. After that, the cavity-forming device b is positioned and installed in the design position, and the pier 11 is formed by adopting a layered concrete pouring construction method. When concrete begins to set, the airbag 8 is deflated and the discharge port 7 is opened. After that, the cavity-forming device b is pulled out. With the pulling out of the cavity-forming device b, the tough material 13 falls into the cavity 12 through the discharge port 7, to complete filling of the tough material 13 into the pier 11.

In order to facilitate extraction of the cavity-forming device b, a release agent is coated on an outer wall of the outer tube body 1.

Technical effects of the cavity-forming device b are as follows.

As there is the tough material 13 stored in the cavity-forming device b, the tough material 13 can play a certain supporting role during pouring, improve an overall strength of the cavity-forming device b, and prevent the cavity-forming device b from being crushed and damaged during pouring. A timing, i.e., after the initial setting of concrete, is selected to pulling out the cavity-forming device b, and a process of filling the tough material 13 while pulling out the cavity-forming device b is adopted to ensure that the filled tough material 13 is effectively connected with the surrounding concrete, forming a fully integrated structure, ensuring the overall strength and absorbing stress, and effectively controlling the crack generation of the pier 11.

In the present disclosure, the cavity-forming device b is used for the reserved construction of the cavity 12. The cavity-forming device b is simple in structure, utilizes readily available materials, and is easily fabricated, which provides convenient conditions for the rapid construction of the cavity 12 and the convenient filling of the tough material 13.

Application test data of the present disclosure are as follows.

In an example 1, a flood gate of a reservoir is 28 m long, with 3 holes in total. Two rows of cavities 12 with an aperture of 8 cm are disposed in the pier 11. A bottom of each cavity 12 extends 0.7 m into the sluice floor 10. A measured maximum stress in the pier 11 is 0.72 MPa, which is less than an ultimate tensile strength of 1.20 MPa of concrete in the pier 11.

In an example 2, a flood gate of a reservoir is 21 m long, with 2 holes in total. A row of cavities 12 with an aperture of 10 cm is disposed in the pier 11. A bottom of each cavity 12 extends 0.5 m into the sluice floor 10. A measured maximum stress in the pier 11 is 0.86 MPa, which is less than an ultimate tensile strength of 1.16 MPa of concrete in the pier 11.

In an example 3, a flood gate of a reservoir is 36 m long, with 4 holes in total. Two rows of cavities 12 with an aperture of 6 cm are disposed in the pier 11. A stress absorption layer with a thickness of 20 cm is set between the sluice floor 10 and the pier 11. A bottom of each cavity 12 extends to the sluice floor 10. A measured maximum stress in the pier 11 is 0.67 MPa, which is less than an ultimate tensile strength of 1.10 MPa of concrete in the pier 11.

In an example 4, a flood gate of a reservoir is 42 m long, with 4 holes in total. Three rows of cavities 12 with an aperture of 8 cm are disposed in the pier 11. A stress absorption layer with a thickness of 30 cm is set between the sluice floor 10 and the pier 11. A bottom of each cavity 12 extends 0.8 m into the sluice floor 10. A measured maximum stress in the pier 11 is 0.74 MPa, which is less than an ultimate tensile strength of 1.15 MPa of concrete in the pier 11.

It can be seen from the above test data that this method can effectively absorb the stress in the pier 11 and ensure that the maximum stress in the pier 11 is less than the ultimate tensile strength of the concrete in the pier 11, thus effectively controlling the crack generation in the pier 11, ensuring the construction quality, and improving the durability and safety of the project.

It should be noted that, if necessary, as a feasible embodiment, a step of circulating cooling water can also be added in the above construction process to reduce an internal temperature of the concrete. There are two ways to arrange cooling water pipes, namely a plum blossom pattern and a grid pattern. In terms of cooling effect, the plum blossom pattern is better than the grid pattern, because it avoids the dead zones that may occur with the grid pattern, but the construction time is harder to control, so the grid pattern is more commonly used in engineering projects. In terms of materials, cooling water pipes mainly include metal pipes and plastic pipes. Metal pipe has strong thermal conductivity and good cooling effect, and is hardly affected by a thickness of the water pipe, but the construction is more complicated. The thermal performance of the plastic pipe is poorer, and the cooling effect is greatly influenced by a wall thickness of the water pipe. The thicker the wall of water pipe, the worse the cooling effect, but the construction is relatively simpler, and it has been used more and more in engineering in recent years. Therefore, whether and how to arrange the cooling water pipes is determined according to an actual engineering situation.

Embodiment 3

Based on the embodiment 1 or the embodiment 2, the tough material filled in the cavity 12 can be selected as follows.

Figure 14:
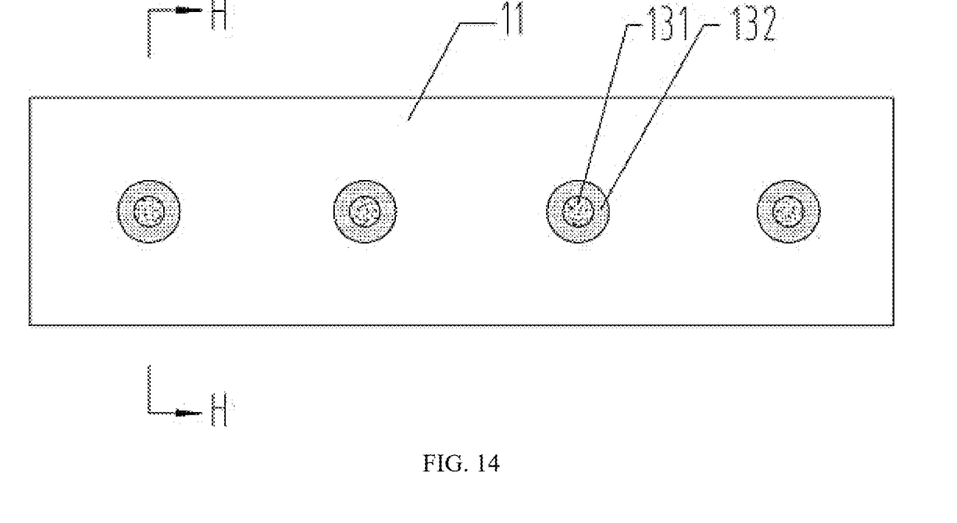
FIG. 14 illustrates a structural sectional view of an example d of the pier from the top-view perspective after being filled with tough materials.
Figure 15:
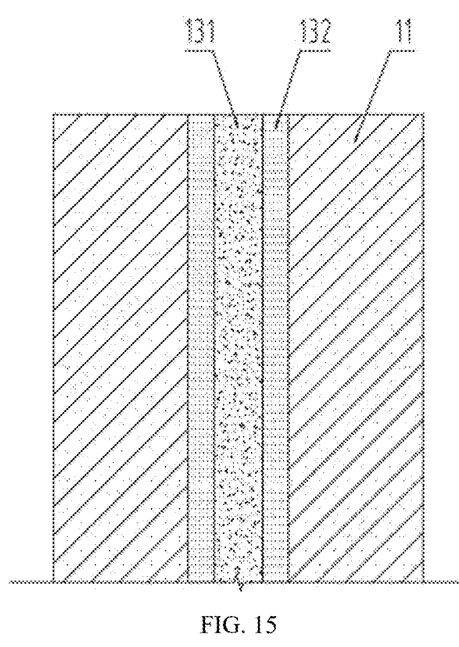
FIG. 15 illustrates a cross-sectional view of FIG. 14 taken along an H-H direction.

The cavity 12 is filled with at least two kinds of tough materials 13 with different strains, and the tough materials with different strains are coaxially sleeved to form a coaxial nested structure, and cross-sectional shapes of the at least two kinds of tough materials 13 are concentric circles, forming different strain gradients. A strain of the tough material 13 decreases from the inside to the outside, and a strain of an inner tough material is greater than that of an outer tough material, that is, the strain of the tough material decreases step by step from the center to a periphery.

Taking two kinds of tough materials with different strains as an example, the inner tough material is a first tough material 131, and the outer tough material is a second tough material 132. A strain of the first tough material 131 is greater than that of the second tough material 132.

In this embodiment, two different tough materials are constructed and filled at the same time, but the strains of the two materials are different, the external strain is smaller and the internal strain is larger, thus forming a certain strain gradient, which is beneficial to avoid stress concentration at the interface between the tough materials and the surrounding concrete, and at the same time improve the integrity of the structure.

In this embodiment, two kinds of tough materials with different strains are introduced, and in practice, it can also be a stress gradient composed of three or four or more tough materials. Theoretically, the more cavities, that is, the richer the stress gradient changes, the better the effect.

In the present disclosure, unless otherwise specified and limited, the terms "installation", "connection", "connection" and "fixation" should be broadly understood, for example, they can be fixed, detachable or integrated; It can be mechanically connected, electrically connected or able to communicate with each other; It can be directly connected or indirectly connected through an intermediary, and it can be the internal connection of two elements or the interaction between two elements, unless otherwise specified. For those skilled in the art, the specific meanings of the above terms in the present disclosure can be understood according to specific situations.

In the present disclosure, unless otherwise specified and limited, a first feature "above" or "below" a second feature may be the direct contact between the first and second features, or the indirect contact between the first and second features through an intermediary. Moreover, the first feature is "above" the second feature can mean that the first feature is directly above or obliquely above the second feature, or just means that the horizontal height of the first feature is higher than the second feature. The first feature is "below" the second feature can mean that the first feature is directly below or obliquely below the second feature, or just means that the horizontal height of the first feature is smaller than the second feature.

In the present disclosure, the terms "one embodiment", "some embodiments", "examples", "specific examples" or "some examples" mean that the specific features, structures, materials or characteristics described in connection with this embodiment or example are included in at least one embodiment or example of the present disclosure. In this specification, the schematic expressions of the above terms are not necessarily aimed at the same embodiment or example. Moreover, the specific features, structures, materials or characteristics described may be combined in any one or more embodiments or examples in a suitable manner. In addition, those skilled in the art can combine and combine different embodiments or examples and features of different embodiments or examples described in this specification without contradicting each other.

What is claimed is:

1. A construction method for a structure for controlling crack generation in a large-volume sluice gate, wherein the structure for controlling crack generation in the large-volume sluice gate comprises:
   a sluice floor and a pier, wherein the sluice floor and the pier are formed by a process of pouring concrete, and the pier is disposed above the sluice floor;
   at least one cavity, defined in the pier, wherein the at least one cavity is reserved in the process of pouring the concrete, and the at least one cavity is used as a self-restraint stress hole; and
   a tough material, wherein the tough material is configured for stress absorption, the tough material is filled in the at least one cavity, and the tough material is integrated with an inner wall of the at least one cavity;
   wherein the construction method comprises the following steps:
   S1, performing construction preparation;
   S2, performing foundation treatment;
   S3, performing construction of the sluice floor, comprising: binding and installing sluice floor reinforcement bars, erecting a sluice floor formwork, concrete pouring, and forming the sluice floor; and
   S4, performing construction of the pier, comprising the following steps:
      S41, performing construction layout;
      S42, binding and installing pier reinforcement bars;
      S43, erecting a pier formwork above the sluice floor;
      S44, pre-embedding and installing a cavity-forming device at a designed position;
      S45, pouring the concrete, vibrating the concrete, and curing the concrete; and
      S46, after the concrete begins to set, extracting the cavity-forming device to form the at least one cavity in the pier, and filling the tough material in the at least one cavity for stress absorption; and
   wherein the cavity-forming device comprises an outer tube body, a bottom end of the outer tube body is connected to a bottom sealing plate, the bottom sealing plate defines at least one discharge port, an inner tube body is disposed in the outer tube body, and a bottom of the inner tube body is fixedly connected to a center of the bottom sealing plate; a space is formed between the inner tube body and the outer tube body and is used as a storage space for storing the tough material; an airbag capable of inflating and deflating is sleeved on the inner tube body, and the airbag is annular; an inner circumferential wall of the airbag is connected to the inner tube body; an air tube is disposed in the inner tube body, a bottom end of the air tube is connected with the airbag, and a top end of the air tube extends above a top of the outer tube body; an air tube is provided with a switch; and when the airbag is inflated, the airbag completely blocks the discharge port, when the airbag is deflated, the discharge port is opened to realize leakage of the tough material.

2. The construction method for the structure for controlling crack generation in the large-volume sluice gate as claimed in claim 1, wherein the tough material is at least one selected from the group consisting of rubberized concrete, acrylic latex-modified concrete, acrylic latex-rubber hybrid concrete, rubberized mortar, and acrylic latex-rubber composite mortar.

3. The construction method for the structure for controlling crack generation in the large-volume sluice gate as claimed in claim 1, wherein the tough material comprises at least two tough materials with different strains, and the at least two tough materials are formed as a coaxial nested structure.

4. The construction method for the structure for controlling crack generation in the large-volume sluice gate as claimed in claim 1, wherein each of the at least one cavity is a fully enclosed structure, and both ends of each of the at least one cavity are closed and entirely embedded within the pier.

5. The construction method for the structure for controlling crack generation in the large-volume sluice gate as claimed in claim 1, wherein each of the at least one cavity is a semi-enclosed structure, a bottom end of each of the at least one cavity is embedded within the pier and is a closed end, and a top end of each of the at least one cavity extends to a top of the pier and connects with an external environment to form an open end.

6. The construction method for the structure for controlling crack generation in the large-volume sluice gate as claimed in claim 1, wherein each of the at least one cavity is an open-type structure, each of the at least one cavity penetrates through the pier from a bottom of the pier to a top of the pier, and both ends of each of the at least one cavity are respectively flush with a bottom surface and a top surface of the pier.

7. The construction method for the structure for controlling crack generation in the large-volume sluice gate as claimed in claim 1, wherein a bottom end of each of the at least one cavity extends through the pier into the sluice floor.

8. The construction method for the structure for controlling crack generation in the large-volume sluice gate as claimed in claim 7, wherein a stress absorption layer is provided at a joint between the sluice floor and the pier, and a bottom end of each of the at least one cavity penetrates through the stress absorption layer.

9. The construction method for the structure for controlling crack generation in the large-volume sluice gate as claimed in claim 1, wherein in step S46, the cavity-forming device is pre-filled with the tough material, and the tough material is filled into each of the at least one cavity synchronously during the extraction of the cavity-forming device.

\* \* \* \* \*